(12) United States Patent
Jang

(10) Patent No.: US 8,807,839 B2
(45) Date of Patent: Aug. 19, 2014

(54) SYNTHETIC RESIN BEARING FOR PHOTOVOLTAIC TRACKING SYSTEM

(75) Inventor: Yun-Kyu Jang, Suncheon-si (KR)

(73) Assignee: OSolar Limited, Seoul (KR)

( * ) Notice: Subject to any disclaimer, the term of this patent is extended or adjusted under 35 U.S.C. 154(b) by 187 days.

(21) Appl. No.: 13/319,296

(22) PCT Filed: Jun. 18, 2009

(86) PCT No.: PCT/KR2009/003284
§ 371 (c)(1),
(2), (4) Date: May 11, 2012

(87) PCT Pub. No.: WO2010/128709
PCT Pub. Date: Nov. 11, 2010

(65) Prior Publication Data
US 2012/0219243 A1    Aug. 30, 2012

(30) Foreign Application Priority Data

May 7, 2009  (KR) ......................... 10-2009-0039897

(51) Int. Cl.
*F16C 33/02*    (2006.01)

(52) U.S. Cl.
USPC ........... 384/432; 384/275; 384/295; 384/416; 384/440

(58) Field of Classification Search
CPC ........ F16C 17/00; F16C 17/02; F16C 17/022; F16C 33/046; F16C 35/02
USPC ......... 384/432, 434, 276, 275, 295, 296, 291, 384/416–419, 428, 438–444
See application file for complete search history.

(56) References Cited

U.S. PATENT DOCUMENTS

| | | | | |
|---|---|---|---|---|
| 2,938,652 A | * | 5/1960 | Polzin | 222/410 |
| 3,746,415 A | * | 7/1973 | Thomson | 384/291 |
| 3,820,860 A | * | 6/1974 | Stone | 384/428 |
| 4,815,585 A | * | 3/1989 | May | 198/672 |
| 5,577,843 A | * | 11/1996 | Leininger et al. | 384/275 |
| 6,058,930 A | * | 5/2000 | Shingleton | 126/600 |

FOREIGN PATENT DOCUMENTS

| | | |
|---|---|---|
| EP | 0571102 A1 | 11/1993 |
| JP | 57188965 A1 | 11/1982 |
| JP | 633944 A | 2/1994 |
| KR | 100754078 B1 | 8/2007 |
| KR | 100886376 B1 | 3/2009 |
| KR | 20090108261 A * | 10/2009 |
| WO | 2008118518 A1 | 10/2008 |

OTHER PUBLICATIONS

International Search Report regarding PCT/KR2009/003284 dated May 24, 2011; 2 pages.

* cited by examiner

*Primary Examiner* — Thomas R Hannon
(74) *Attorney, Agent, or Firm* — Armstrong Teasdale LLP

(57) ABSTRACT

A synthetic resin bearing for a photovoltaic tracking system includes first and second bearing members coupled with each other for forming a bearing assembly. Each of the first and second bearing members has a pair of side plate members facing each other. A friction member is positioned between outer peripheral portions of the pair of side plates has an arc-shaped section. A reinforcement member connects the pair of side plates and the friction member, and the first and second bearing members have a coupling protrusion and a concave portion for receiving the coupling protrusion.

11 Claims, 4 Drawing Sheets

SYNTHETIC RESIN BEARING FOR PHOTOVOLTAIC TRACKING SYSTEM

FIELD OF INVENTION

The present invention is related to a synthetic resin bearing for a photovoltaic tracking system. More particularly, the present invention is related to a synthetic resin bearing to support a solar panel on the tracking system to rotate the angle of the solar panel in relation to the angle of the sun.

BACKGROUND ART

As there are many types of development in energy substitution to replace fossil fuels due to the recent energy crisis, one of them is to use solar energy. The use of solar energy can be categorized into two types; one of the types is to use solar radiation for heating and the other type is to convert solar energy into electricity using solar cells.

In either way, in order to use solar energy, it is necessary to have a device to collect the solar energy and the solar panels are generally used to absorb energy by directly facing the sunlight. This type of solar panel has a structure of multiple solar cells in a flat type structure or having conduits to circulate operating fluids and the efficiency depends on the altitude of the sun.

Accordingly, a tracking system to control the angle of the solar panel according to the altitude of the sun was used traditionally. This type of tracking system can be categorized as a one-axis system or two-axis system depending on the number of rotational axes and is designed to gain maximum efficiency by adjusting the angle of the solar panel automatically or manually depending on the altitude of the sun with measured or previously gathered data.

This type of solar panel is anchored on top of a rotational torque tube on top of the post on the ground. On the other hand, said torque tube which supports the solar panel is supported by a post in the ground and the bearing is installed between the torque tube and post to enable smooth rotation. Traditionally, said bearing is made of metal and a lubricant is applied to improve lubrication and to prevent wear. But said lubricant must be added periodically and since the solar panels are installed on a vast area, adding lubricant is extremely inconvenient and hard to do. Especially, while the lubricant has to be added to maintain friction coefficient to prevent the movement of solar panel due to wind pressure, the difficulty of work increases.

Additionally, as outside dirt can attach to the lubricant, a process of periodic cleaning has to be done at the same time.

DETAILED DESCRIPTION OF THE INVENTION

Technical Challenges

The present invention is devised to overcome the above mentioned traditional disadvantages, and to provide synthetic resin bearing assembly for a photovoltaic tracking system to keep proper friction coefficient without the necessity of applying a lubricant.

TECHNICAL SOLUTION

In order to achieve said technical challenges, the present invention is a synthetic resin bearing for a photovoltaic tracking system including the first and second bearing members coupled with each other for forming a bearing assembly, wherein each of the first and second bearing members comprises of a pair of side plate members facing each other; a friction member positioned between the outer peripheral portions of the pair of side plates and having an arc shaped section; and a reinforcement member for connecting the pair of side plates and the friction member, and the first and second bearing members have a coupling protrusion and a concave portion for receiving the coupling protrusion at the coupling surfaces thereof.

Accordingly, the present invention is to provide the bearing with synthetic resin instead of a metal material and maintaining the proper friction coefficient which made it unnecessary for the addition of lubricant. The said synthetic resin includes polyamide, PTFE or PEEK material. In addition, inside of said bearing assembly is not fully filled but is composed of plates such as reinforcement members linked with said plates and friction members and partially empty spaces inside. By doing this, it can reduce the overall weight and reduce the usage of material. It can also prevent molding defects such as shrinkage during the molding process.

Here, said reinforcement member can be a grid type partition wall linking said pair of side plate members and said friction members In addition, a guide protrusion can be formed at both ends of said friction member to guide corresponding friction material.

In addition, on the surface of said friction member, multiple grooves along the friction's surface of said friction member can be formed. By doing this, friction surface can be reduced and thus can prevent problems such as reduction of lubricant efficiency or joint problem due to shrinkage of the material outside of the bearing during the winter season. In addition, during the rainy season, the rain can be easily drained and consequently it can prevent various problems due to corrosion caused by rain water and freezing.

Here, the width of said groove can be formed to increase as it goes to the outer peripheral of said friction member.

Advantageous Effects

According to the invention having said structure, as the bearing is made from synthetic resin instead of metal, proper friction coefficient can be maintained without adding lubricant, the maintenance is easy and the overall system life expectancy can be increased.

In addition, as it is manufactured to have partial empty spaces inside the bearing assembly, overall weight can be reduced and the material to be used can also be reduced. In addition, having molding defects due to shrinkage during the molding process can be prevented.

Additionally, multiple grooves can be formed on the surface of the friction member, thus it can prevent problems such as a reduction of lubricant efficiency or joint problems due to undue load because of the variations of friction surface due to outside environmental changes. In addition, during the rainy season, the rain can be easily drained and consequently it can prevent various problems such as corrosion caused by rain water and freezing.

EMBODIMENT OF THE INVENTION

The photovoltaic tracking bearing assembly according to the embodiment of the present invention will be described in detail with drawings.

Figure 1:
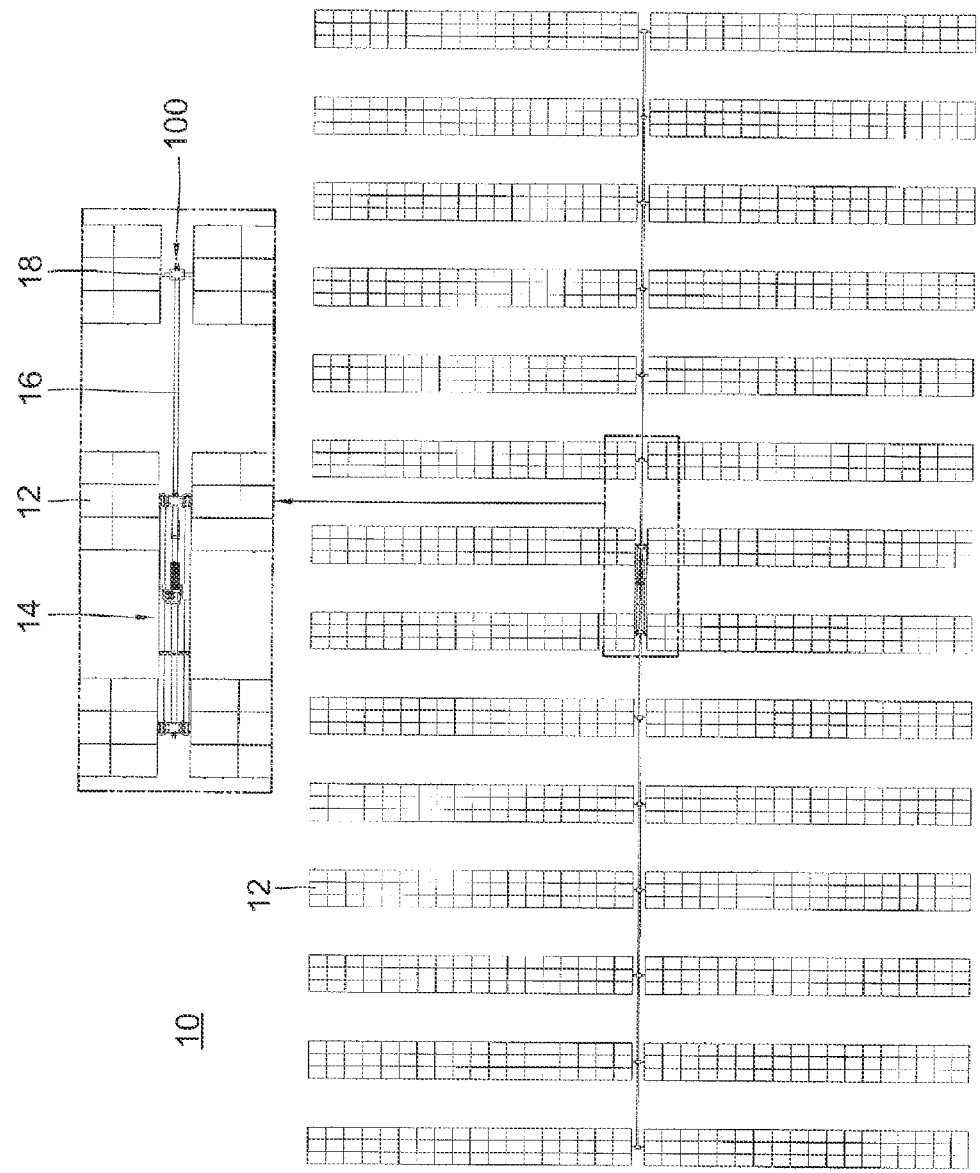
FIG. 1 illustrates a planar view of schematic array of the traditional solar energy generation devices.

FIG. 1 illustrates one example of a tracking device (10) composed on one axis system where one example of bearing assembly according to the present invention can be implemented. According to FIG. 1, multiple rows of solar panels (12) are mounted on the torque tube (18) and in the center of multiple rows of said solar panel (12), an actuator (14) is located. In addition, a linkage (16) is included across the multiple rows of said solar panel (12). The said linkage (16) can be moved left and right by said actuator (14) and the angle of solar (12) can be changed due to the movement of the bearing assembly (100) that connects said linkage (16) and said torque tube (18).

Figure 2:
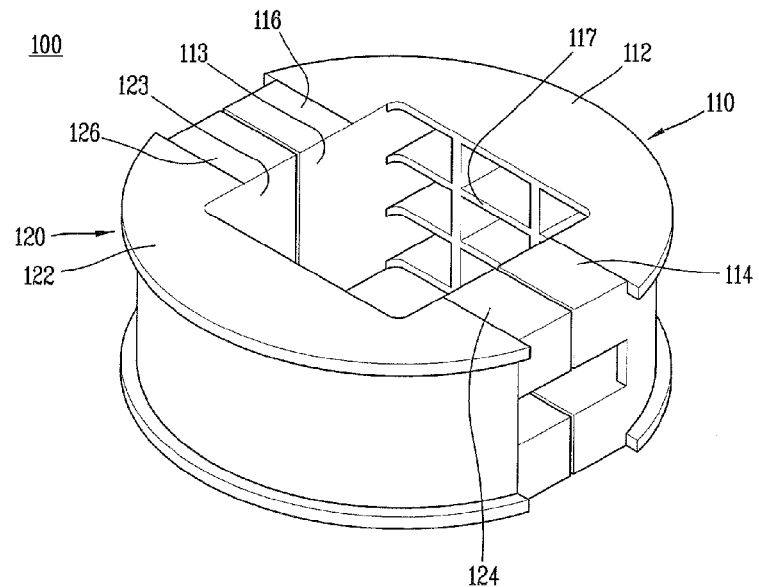
FIG. 2 illustrates a front view of first example of bearing assembly implemented by the present invention.
Figure 3:
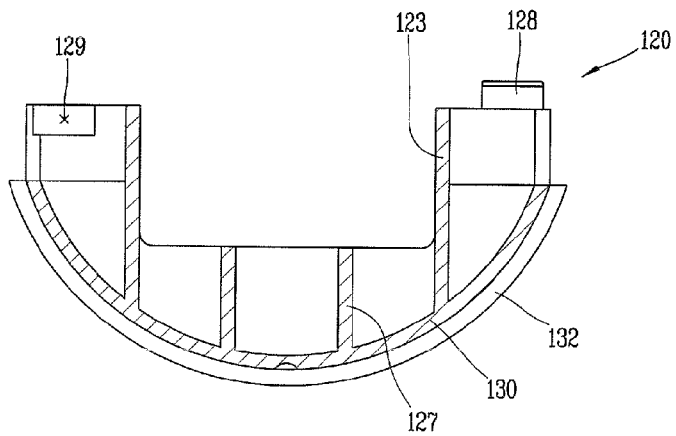
FIG. 3 illustrates the cross section of the second bearing member.
Figure 4:
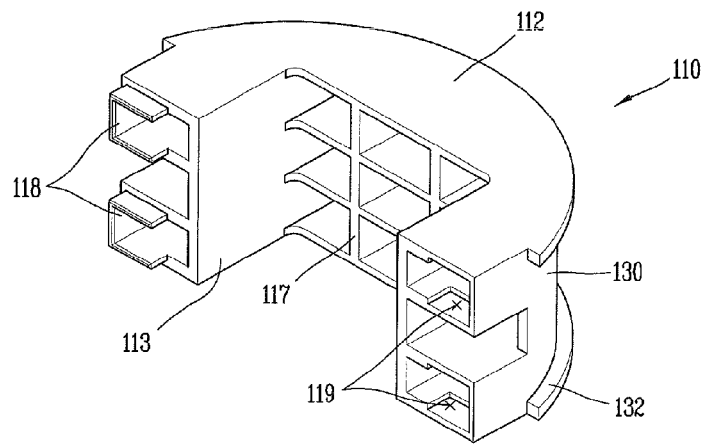
FIG. 4 illustrates the perspective of the example depicted in FIG. 2.

If you refer to FIG. 2 through FIG. 4, one example of the bearing assembly (100) according to the present invention is illustrated. Said example (100) is basically composed of first bearing member (110) and the second bearing member (120) which are coupled to form one bearing assembly and said first and second bearing member has the same type but designated with different names to facilitate the description.

Said first bearing member (110) has a pair of side plates (112), said side plates (112) have an arc shape and have two coupling members (114, 116) at both ends. A space is formed between said coupling members. In that space, there is a rectangular shaped torque tube where said solar panel is anchored to. On the other hand, guide protrusions (118 in FIG. 4; 128 in FIG. 3) are formed in the coupling members (116, 124), said guide protrusions (118, 128) are inserted into concave portions (129 in FIG. 3; 119 in FIG. 4) enabling the first and second bearing member (110, 120) to be coupled together.

On the other hand, in the coupling member (114, 116) of said pair of side plates (112) is formed to face said torque tube and a grid type reinforcement member (117) is formed adjacent to a contact surface (113). In other words, said reinforcement member (117) is formed within the rectangular space between a pair of side plates (112) and a pair of contact surfaces (113) and it is also connected to a friction member which will be described later to function as a supporting base for said first bearing member (110). In addition, said reinforcement member (117) can also perform a function to prevent contraction during the molding process.

Here, undescribed members 122, 123, 124, 126, 127 and 128 in the second member (120) are respectively side plates, contact surface, coupling member, coupling member, reinforcement member, and guide protrusion. As these are the same components of the first bearing member that was described previously, the description will be omitted for duplicity.

If you refer to FIG. 3, a cross section of said second bearing member is illustrated. As described in the drawing, a reinforcement member (127) is extended to friction member (130) and said friction member (130) is composed of an overall arc shaped plate material. In addition, said contact surface (123) is extended from the end of said coupling member (126) to the rear of said friction member (130) and said concave portion (129) is formed concavely in said coupling member (126).

If you refer to FIG. 4, said friction member (130) is illustrated. Said friction member (130) has an arc shaped surface to contact with lubricating material and the guide protrusion (132) is formed at the both ends of it to prevent the lubricating material from departing from the lubricating surface. So that the lubricating material is locked between said guide protrusion (132) and can slides.

Figure 5:
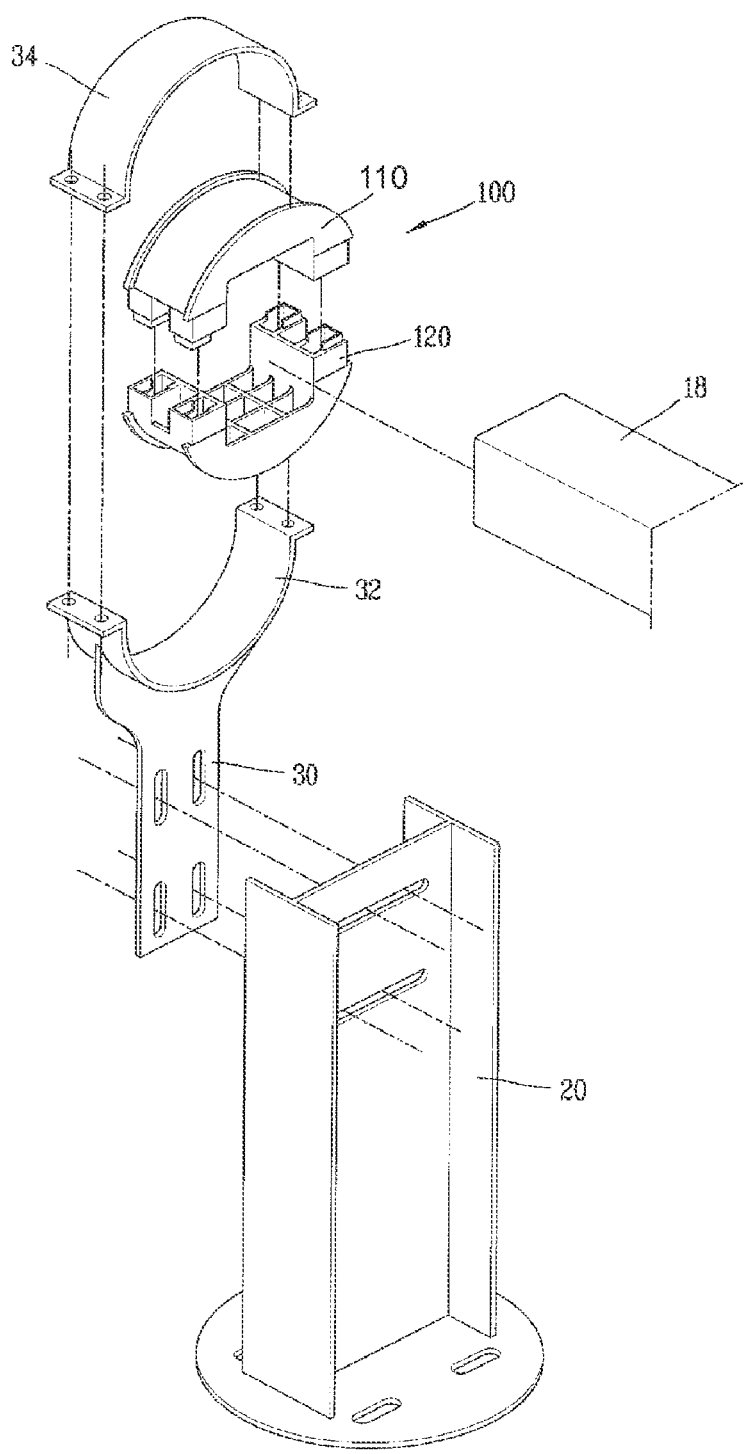
FIG. 5 illustrates the perspective of the example of implementation depicted in FIG. 2.

The first embodiment of the invention (100) will be described using FIG. 5. The symbol 20 in the FIG. 5 is a post to safely mount the solar panel on the ground, the symbol 30 is journal half fixture, 32 is the first half, 34 is the second half. Said first journal half fixture (30) and said first half (32) is formed as a single piece and said second journal half (34) is connected to first half (32) with a bolt. On the other hand, said bearing assembly (100) fastens the torque tube (18) while is linked between said first and second journal half (32, 34).

Figure 6:
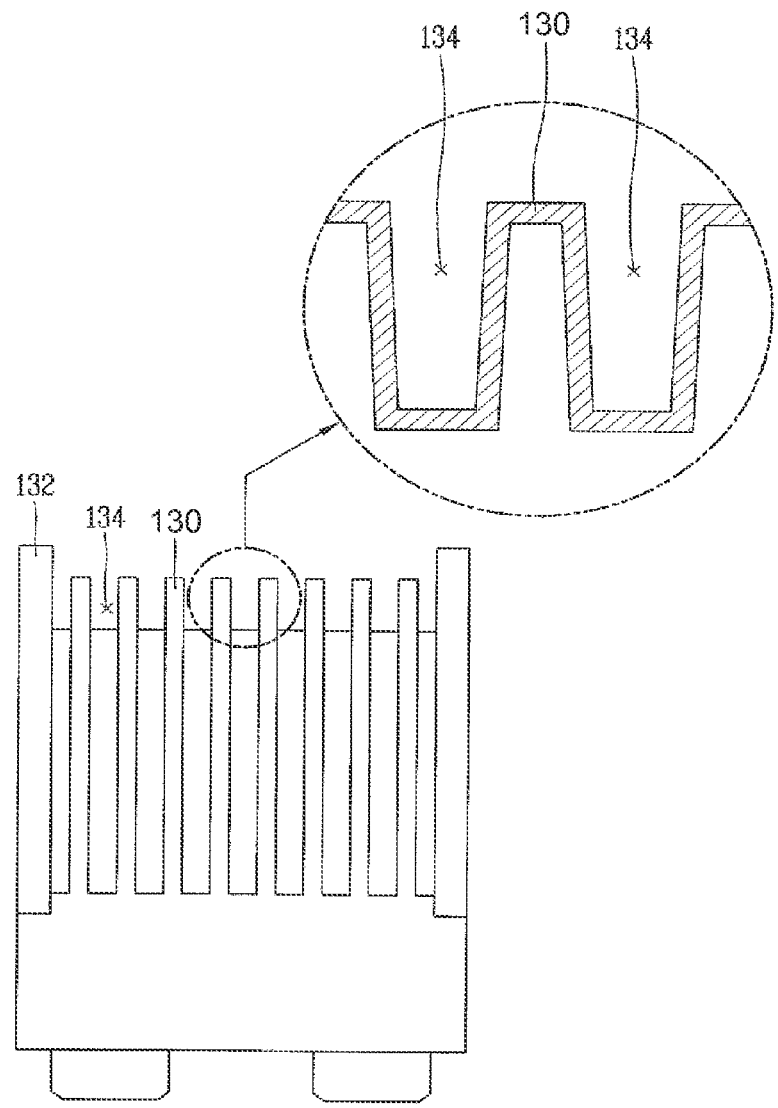
FIG. 6 illustrates cross section of the second implementation of the bearing assembly according to the present invention.

On the other hand, said friction member (130) is not restricted to the type as illustrated but it is possible to transform to shape as illustrated in FIG. 6. If you refer to FIG. 6, there are multiple grooves (134) in the friction side of said friction member (130), the width of said groove (134) can increased as it go to the top portion. By utilizing this, contact surface with said first and second journal half can be reduced and can provide smooth operation even under undue load caused by weather related shrinkage of the journal halves. In addition, said groove (134) can be utilized as a drainage road during the rainy season, it can prevent the degradation of lubricant efficiency due to freezing of water gathered between the friction surfaces.

The invention claimed is:

1. A synthetic resin bearing assembly comprising first and second bearing members connected to one another, wherein each of the first and second bearing members include a pair of side plates facing one another and having outer peripheral portions; a friction member positioned between the outer peripheral portions of the pair of side plates and having an arc shaped section; and a reinforcement member for connecting the pair of side plates and the friction member, the first and second bearing members having a coupling protrusion and a concave portion for receiving the coupling protrusion.

2. The resin bearing assembly of claim 1 wherein the reinforcement member has a partitioning wall connecting the pair of side plates and the friction member.

3. The resin bearing assembly of claim 1 wherein the friction member includes a guide protrusion at ends thereof.

4. The resin bearing assembly of claim 3 wherein the friction member includes a friction surface having multiple grooves.

5. The resin bearing assembly of claim 4 wherein a width of the grooves increases toward the outer peripheral portions of the bearing members.

6. The resin bearing assembly of claim 1 in combination with a journal bearing housing including a first member and a second member, the resin bearing assembly mounted in the journal bearing housing.

7. The resin bearing assembly and journal bearing housing of claim 6 wherein the first member and the second member are connected to one another and surround the resin bearing assembly, wherein each member is positioned between the pair of side plates and adjacent to the friction members.

8. The resin bearing assembly of claim 1 including a void therethrough extending from one side of the bearing assembly to a second side of the bearing assembly opposite the first side.

9. The resin bearing assembly of claim 8 wherein the void in the assembly has a rectangular shape.

10. The resin bearing assembly of claim 8 further comprising a torque tube fixed within the void.

11. The resin bearing assembly of claim 10 wherein the torque tube is connected to at least one solar panel.

* * * * *